(12) United States Patent
Minges

(10) Patent No.: US 7,640,863 B2
(45) Date of Patent: Jan. 5, 2010

(54) SYSTEM FOR STORAGE AND RETRIEVAL OF WAREHOUSABLE OBJECTS

(76) Inventor: Marcus C. Minges, 2616 Starlight Dr., Tuscaloosa, AL (US) 35405

( * ) Notice: Subject to any disclaimer, the term of this patent is extended or adjusted under 35 U.S.C. 154(b) by 148 days.

(21) Appl. No.: 11/098,224

(22) Filed: Apr. 4, 2005

(65) Prior Publication Data

US 2005/0238467 A1    Oct. 27, 2005

Related U.S. Application Data

(60) Provisional application No. 60/558,822, filed on Apr. 2, 2004.

(51) Int. Cl.
*E01B 25/00* (2006.01)
(52) U.S. Cl. .............................. 104/130.03; 104/130.09
(58) Field of Classification Search ............ 104/130.01, 104/130.02, 130.03, 130.05, 130.09, 127, 104/128, 129
See application file for complete search history.

(56) References Cited

U.S. PATENT DOCUMENTS

| | | | |
|---|---|---|---|
| 243,244 A | 6/1881 | Goodell | |
| 620,801 A | 3/1899 | Pratt | |
| 1,101,910 A | 6/1914 | Elmqvist | |
| 2,507,887 A | * 5/1950 | Cheney | 187/201 |
| 2,528,265 A | 10/1950 | Cretors | |
| 2,612,238 A | 9/1952 | Angelicola | |
| 2,632,402 A | 3/1953 | Reussner | |
| 2,798,267 A | * 7/1957 | Anderson | 164/200 |
| 3,168,937 A | 2/1965 | Redford, et al. | |
| 3,176,628 A | 4/1965 | Reid | |
| 3,533,357 A | 10/1970 | Brandon | |
| 3,774,548 A | 11/1973 | Borst | |
| 3,818,836 A | 6/1974 | Swilley | |

(Continued)

FOREIGN PATENT DOCUMENTS

DE        9320592        1/1995

(Continued)

OTHER PUBLICATIONS

European Patent Office; Supplementary European Search Report dated Jun. 19, 2008 (search completion date Jun. 11, 2008) in application EP 01962270 (an application by the same inventor, claiming priority to U.S. Patent 6,666,147).

(Continued)

*Primary Examiner*—S. Joseph Morano
*Assistant Examiner*—Robert J McCarry, Jr.
(74) *Attorney, Agent, or Firm*—Bradley Arant Boult Cummings, LLP

(57) ABSTRACT

A track system for storage and retrieval of materials for use with warehousing vehicle that rides upon tracks in horizontal configuration for storage locations, and that is capable of switching to and riding a sloped track to ascend or descend vertically. A set of transition exchanges allows the vehicle to access multiple levels of storage "flooring" or shelving. The exchanges use ramps, or movable sections of railway, that may be moved out of the way of a set of wheels of the vehicle, while other ramps are set in place to provide support to some wheels of the vehicle, whereby the vehicle may selectively either travel along the elevator track, or to move between elevator track and level storage locations.

6 Claims, 7 Drawing Sheets

U.S. PATENT DOCUMENTS

| | | |
|---|---|---|
| 3,891,062 A | 6/1975 | Geneste |
| 3,935,822 A | 2/1976 | Kaufmann |
| 4,015,537 A | 4/1977 | Graef et al. |
| 4,026,388 A | 5/1977 | Creissels |
| 4,278,165 A | 7/1981 | Nielsen |
| 4,550,806 A | 11/1985 | Bocker |
| 4,602,567 A | 7/1986 | Hedstrom |
| 4,627,517 A | 12/1986 | Bor |
| 4,821,845 A | 4/1989 | DeViaris |
| 4,961,385 A | 10/1990 | Abouzakhm |
| 5,069,141 A | 12/1991 | Ohara et al. |
| 5,231,933 A | 8/1993 | DiRosa |
| 5,398,617 A | 3/1995 | Deandrea |
| 5,419,260 A | 5/1995 | Hamilton |
| 5,476,155 A | 12/1995 | Nakatani et al. |
| 5,533,594 A | 7/1996 | Tremblay |
| 5,572,930 A | 11/1996 | Hein |
| 5,676,189 A | 10/1997 | Zeeb |
| 5,713,432 A | 2/1998 | Richter et al. |
| 5,964,159 A | 10/1999 | Hein |
| 5,967,265 A | 10/1999 | Bruno et al. |
| 6,053,286 A | 4/2000 | Balmer |
| 6,178,891 B1 | 1/2001 | Ostholt et al. |
| 6,237,705 B1 | 5/2001 | Nakatani et al. |
| 6,240,851 B1 * | 6/2001 | Oudakker et al. ............ 104/127 |
| 6,539,876 B1 * | 4/2003 | Campbell et al. ...... 104/130.01 |
| 6,666,147 B1 | 12/2003 | Minges |
| 2004/0168605 A1 | 9/2004 | Minges |

FOREIGN PATENT DOCUMENTS

| | | |
|---|---|---|
| EP | 317782 | 10/1989 |
| WO | WO92/20604 | 11/1992 |
| WO | WO 02/22422 | 3/2002 |

OTHER PUBLICATIONS

European Patent Office; Supplementary European Search Report dated Apr. 16, 2008 (search completion date Apr. 8, 2008) in application EP 05733240 (an application by the same inventor, claiming priority to the same U.S. provisional of which this current application claims benefit).

* cited by examiner

SYSTEM FOR STORAGE AND RETRIEVAL OF WAREHOUSABLE OBJECTS

This application claims the benefit of and priority to U.S. Provisional Application 60/558,822 filed Apr. 2, 2004

BACKGROUND OF THE INVENTION

1. Field of the Invention

This invention relates generally to solutions for storing, moving, and retrieving objects in warehousing or high density storage environments. More particularly, the invention is directed toward a system for racking or storage and retrieval of multiple items as in a warehouse or librarying environment.

2. Description of Related Art

The industry is aware of the need for increasing efficiency and capabilities of storage in high density situations. In the art, warehouses and high volume storage are typically effected with the use of devices that rely upon an overhead or floor-based support. By way of example, forklifts are frequently employed, which ride on the floor, and lift products to various shelving levels. Passage under the forklifts for persons, other equipment, and the like is not practicable. Alternately, the industry uses overhead cranes and tracks to guide products to storage shelving. Similarly, the number of operable pendant systems is limited by the fact that such devices have difficulty passing one another.

OBJECTS OF THE INVENTION

The following stated objects of the invention are alternative and exemplary objects only, and should not be read as required for the practice of the invention, or as an exhaustive listing of objects accomplished.

An exemplary and non-exclusive alternative object of this invention is to provide a multilevel storage and retrieval vehicle and for use with an associated racking system.

A further exemplary and non-exclusive alternative object is to provide a multilevel storage and retrieval vehicle and racking system in which a vehicle can move independent of the floor or overhead cranes.

Still further exemplary advantages could be recited, though not all are necessary for a system or device to fall within the scope of this invention. For (non-limiting) example, only, the described system does not necessarily include a boom or mast yet it can reach extremely high areas within a storage facility. Unlike industrial trucks or fork lifts, it has a reduced tendency to "tip over;" the vehicle 10 can operate above head-height of personnel, creating an "area system" virtually eliminating human contact or interference; the vehicle 10 may be configured to negotiate very narrow aisles at much greater speeds than traditional devices like a bridge crane, and to pass over stored items, yet unlike a crane also can travel under stored items; it requires in some configurations no heavy counterweight, and therefore could be made more economical and flexible than traditional solutions; it may work well in unusual environments i.e., frozen, wet, hazardous, or underground; it has particular usefulness in ships and mobile equipment, as the entire storage area might be tilted or incur severe shock from outside; in addition, depending upon desire, one vehicle can be used to store, retrieve and deliver items saving many steps in process; the described system may be computer controlled saving operator cost and reducing errors. These discussed advantages are exemplary only, and absence of any or all of these should not be construed as limiting the scope of the invention.

The above objects and advantages are neither exhaustive nor individually critical to the spirit and practice of the invention. Other or alternative objects and advantages of the present invention will become apparent to those skilled in the art from the following description of the invention.

BRIEF SUMMARY OF THE INVENTION

A track system for storage and retrieval of materials for use with warehousing vehicle that rides upon tracks in horizontal configuration for storage locations, and that is capable of switching to and riding a sloped track to ascend or descend vertically. A set of transition exchanges allows the vehicle to access multiple levels of storage "flooring" or shelving. The exchanges use ramps, or movable sections of railway, that may be moved out of the way of a set of wheels of the vehicle, while other ramps are set in place to provide support to some wheels of the vehicle, whereby the vehicle may selectively either travel along the elevator track, or to move between elevator track and level storage locations.

DETAILED DESCRIPTION OF THE INVENTION

Figure 1:
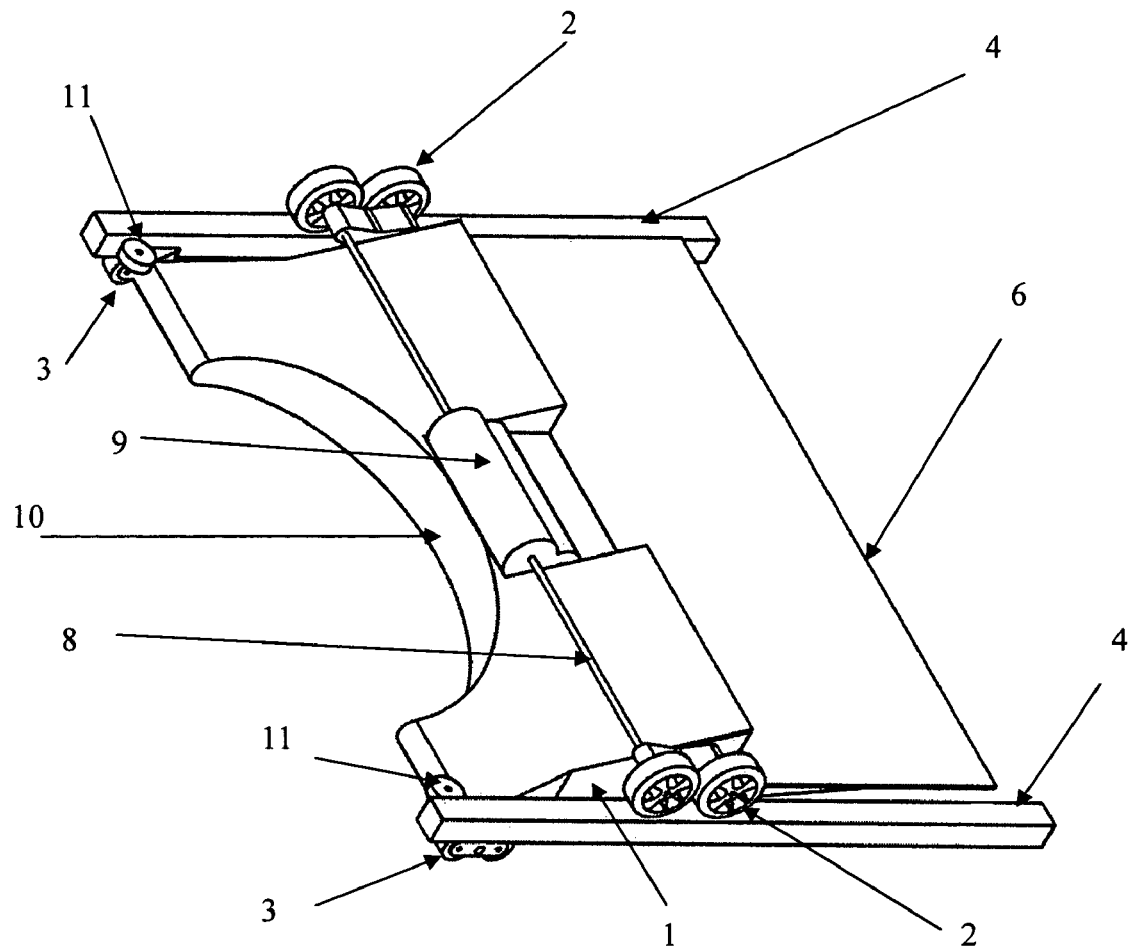
FIG. 1 shows a diagram of an warehousing vehicle for use with the present invention, resting on a segment of track.

The following is a detailed description of the invention. Those skilled in the art will understand that the specificity provided herein is intended for illustrative purposes with respect to the inventor's preferred and most preferred embodiments, and is not to be interpreted as limiting the scope of the invention. The inventor notes that it uses the term "rails" to refer to any weight-bearing configuration such as beams, planks, pipes, runners, paired-and-recessed grooves, etc. Within the meaning of a "rail," a set of paired upper and lower surfaces may be created from separate components to make a single rail. Where the inventor describes wheels, it will be understood that serpentine belts, conveyor tracks, bearings, skids, skis, and rollers, or multiples of these, or other known movement mechanisms may be employed.

This system is applicable to a type of Automated Storage and Retrieval System also known as AS/RS in the art of materials handling. This disclosure addresses several alternative configurations of such equipment design. There may be a need for multiple changes in scale and configuration, all of which remain in the spirit and scope of the invention, as material handling in nature is often very diverse and specific to many types of materials and the manner in which they are to be handled, stored and delivered. The described materials handling system may be configured to take advantage of any of many alternative advantages over current devices.

The system may contain the following (separately, together, or among others).

1. Transport Equipment
2. Positioning Equipment
3. Load Development Equipment
4. Incline to level Exchanges
5. Storage Equipment
6. Remote Access track or tracks
7. And/or other Features The student of this disclosure will see that the transport equipment is a track-guided or track-riding vehicle that may exhibit capabilities overlapping those of a bridge crane or forklifts. Described generally, the system involves a vehicle 10 that rides on a track 4. More specifically, the track 4 may be split into vertically (and possibly horizontally) separated tracks 4, such that the vehicle 10 can travel on any number of levels of track 4 for storage or movement purposes (see generally FIG. 3). In an aspect taught herein, the set of tracks 4 is provided with an elevator track 30, which is similar to the other tracks 4, but crosses or intersects with multiple levels of the tracks 4. It will be seen (e.g., FIG. 3) that the elevator track 30, by crossing other tracks 4, provides a path for travel of the vehicle 10 allowing it to both travel along tracks 4 (or access them for dropping off or picking up items for storage), and to move between or among such tracks 4, changing levels as may be necessary. In order to facilitate such activity, the intersection of elevator track 30 and track(s) 4 is provided with "exchanges," which are further described herein. As should be understood, if the exchanges were static configurations in which the elevator track 30 and the track(s) 4 were in a fixed relationship, passage of the vehicle 10 to multiple tracks or locations would not be possible. For example, where the elevator track 30 is a perfectly plumb track, and the track(s) 4 are perfectly horizontal, each of the tracks 4 would intersect the elevator track 30 at a "T" intersection. A set of three tracks 4 connected to a single elevator track 30 would look like an "E" in one configuration (the horizontal bars of the E being the tracks 4, and the vertical bar being the elevator track 30). In such a configuration, there would be no way for the vehicle 10 to pass along the lowest track 4, travel up the elevator track 30, and ride along the top of either the highest or second highest track 4. This is because the static connection between the elevator track 30 and tracks 4 (e.g., in the example, between the vertical bar and the horizontal bars) would prevent passage of the wheels or the body of the vehicle 10 from one level to the next. Certain described embodiments of the present invention address this problem by creating exchanges that operate by opening pathways for wheels of the vehicle 10 to pass through. Basically speaking, then, the exchanges involve having "ramps" and "pathways," with the ramps being movable sections of track (whether of track(s) 4 or elevator track 30) that are made to be present for a wheel to ride upon either during a transition from track 4 to elevator track 30 or, separately, during continued travel along elevator track 30, and with "pathways" being created by moving a movable section of the track (again, whether of track(s) 4 or elevator track 30) away from the desired line of travel along the track so that the wheel can pass through that area. Stated another way, paths are created by removing a section of track when and where a wheel or portion of the vehicle 10 needs to essentially pass "through" the track's fully connected configuration.

Figure 2:
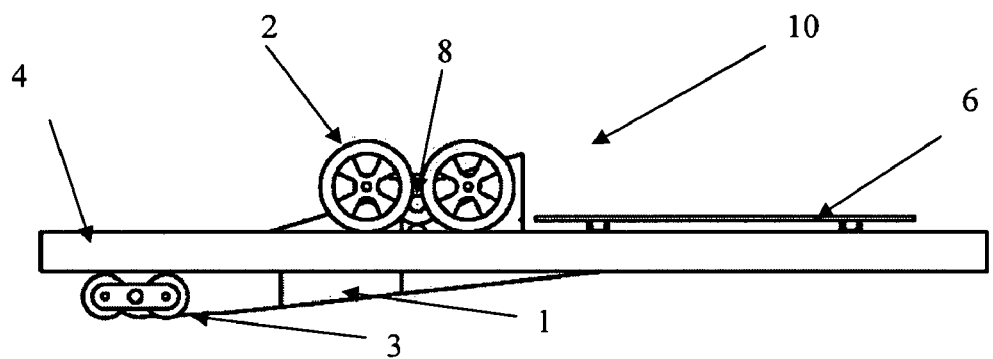
FIG. 2 depicts an warehousing vehicle for use the present invention from a side view.

Described basically as shown in the embodiment of FIG. 1, the vehicle 10 includes two sets of wheels, 2 and 3, and a load platform 6. The body of vehicle 10 may include side panels 1, a drive source 9, and axles 8. Side panels 1 can be substituted with or made part of any other body structure, such as a unitary body structure as shown in FIG. 1. Further embellishments may include a power source such as battery packs 5 (see FIG. 12), and storage bin actuators for control of action of bins, tracks, or shelving (or other items), or other features. As seen from FIG. 1, the vehicle 10 may be mounted on a track 4 (the track 4 being shown truncated for ease of depiction). FIG. 2 is a side view of the vehicle 10 on a track 4 (again, the track 4 being truncated in the drawing). Track 4 may be located on (or configured as grooves recessed within) opposite walls of an area, on shelves on either side of an aisle, or as free-standing racks of tracks within a facility. Stated generally, the vehicle 10 in the shown embodiment rides on track 4, with contact above the track 4 made via top running "traction wheels" 2. Lower running "road wheels" 3 are provided below the track 4 and to the rear of the traction wheels 2 opposite the center of gravity (in its loaded and unloaded condition) of the vehicle 10. These road wheels 3 thus terminate a natural tendency of vehicle 10 to rotate about the traction wheels 2, thereby increasing traction, stability and providing for proper load positioning. The center of gravity thus generally is forward of the traction wheels 2, opposite of the road wheels 3 (horizontally speaking). The vehicle 10 thus maintains contact with the track 4 in a cantilever manner. The wheels may extend outside of the vehicle 10 and load platform 6, allowing vehicle 10 and the load platform 6 to rest and move comfortably between the rails of the track 4. The vehicle 10, and particularly load platform 6 is shown in line with the track 4, with the wheels 2 and 3 meeting the track 4 on upper and lower sides, respectively. As will be apparent, the greater the weight of the load, the greater the friction/cantilever effect, and thus the greater traction.

It will be seen that by track 4 is meant a horizontally separated paired or set of rails that are configured to sit to either side of the vehicle 10. Each set of wheels (2 and 3) comprise at least two wheels, one for contacting the first rail of the track on a first side of the vehicle 10, and the other for contacting the second rail of the track on the second side of the vehicle 10. Each set of wheels, then, could actually even comprise a single cylindrical or tubular member that spans the gap and contacts both the first rail and the second rail, with the ends of the tube being considered the wheels where touching the rails. Alternately, the sets could include multiple wheels in contact with the first rail and multiple wheels that contact the second rail. Such multiple wheels could be configured in many relationships, including possibly using a wheel chassis that pivots about an axis (see, e.g., FIGS. 5 and 6, and FIGS. 1 and 2).

The vehicle 10 may in some embodiments be self-propelled, including from either an on-board or external power supply or both. It also may be provided with any desired handling and manipulating devices, such as actuators, and platforms 6, or with other equipment suitable for placing, extending, retrieving, adjusting, manipulating or transporting items. Such devices may include advanced features such as robotic arms, carousels, and/or vending equipment. In addition, the vehicle 10 may be provided with onboard data collection and or transmission system, and other computer processing to communicate with external control and or monitoring stations. The vehicle 10 can take advantage of product identification devices commonly used in the industry for inventory control, product acquisition and or recognition. Radio Frequency I.D., bar codes and magnetic stripe are some non-limiting examples of product identification systems to be used. Location detection within the facility can also be used independently or in conjunction with product identification systems for the same purpose. For example, in some installations the vehicle 10 might not be programmed with the identity of the objects it transports, but only its origin and destination. The external control station can coordinate such activities and could keep track of what the vehicle 10 is actually transporting. The vehicle 10 could be equipped with an onboard microprocessor in which the vehicle 10 could process data associated with inventory, product flow, routing, supply and demand as well independently monitor the environments while in storage and/or in transportation.

Figure 3:
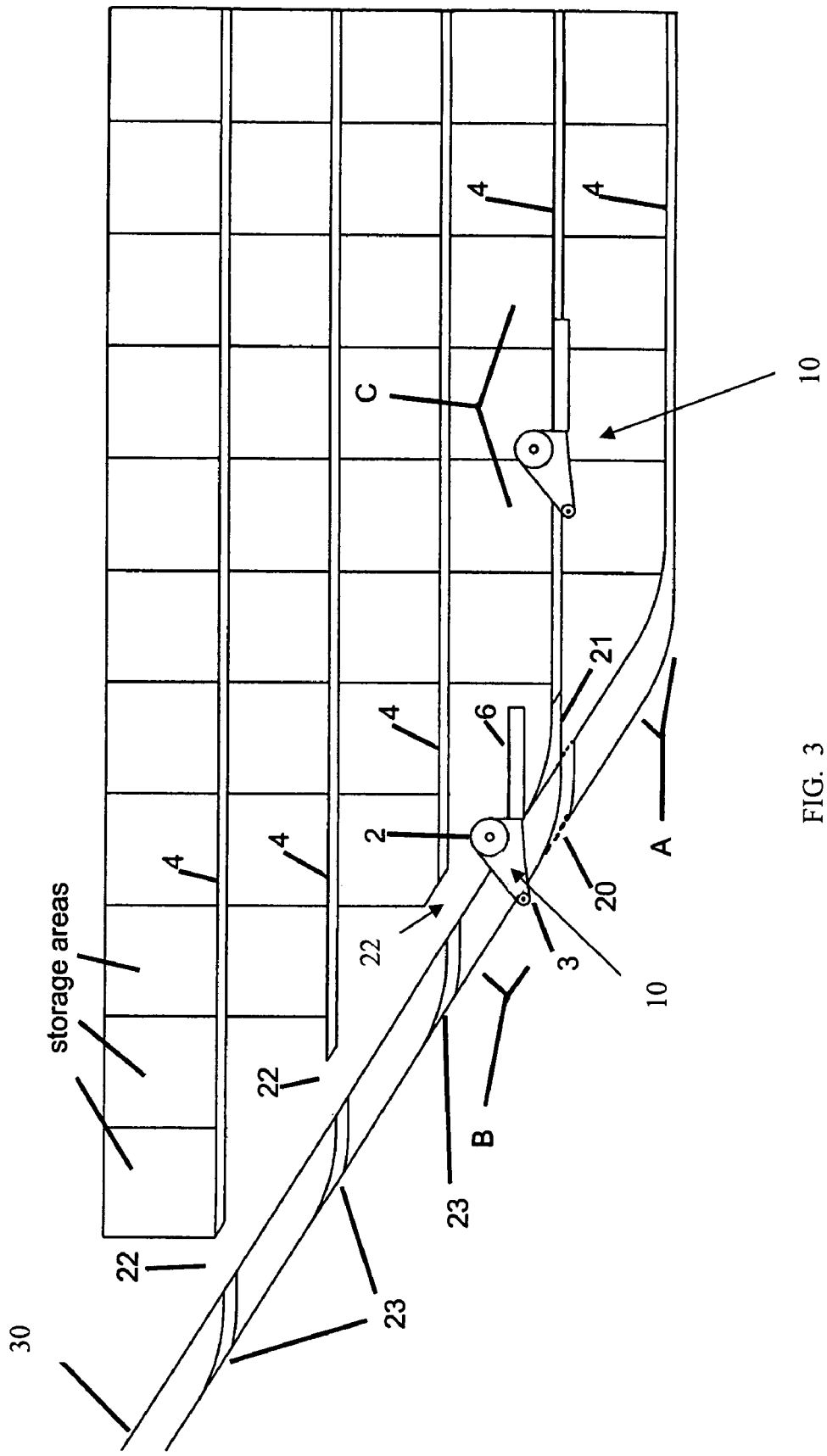
FIG. 3 shows a side view of the warehousing vehicle for use with the present invention, in connection with a track system for the present invention.
Figure 4:
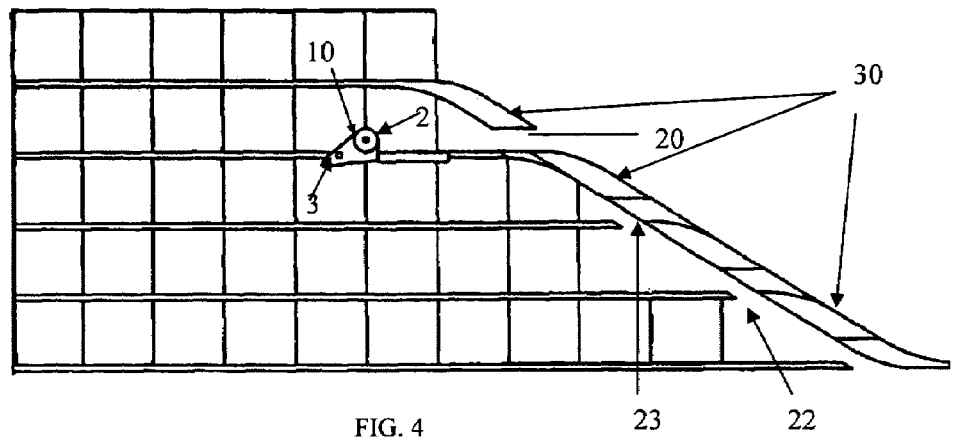
FIG. 4 shows a side view of a different configuration of the track system, with storage beneath the elevator track.

The vehicle 10 travels on a track 4 or tracks 4 and in accordance with the invention may travel back and forth along tracks 4 that are positioned at different vertically separated levels within a given aisle. It will be seen from FIG. 3 that the configuration of vehicle 10 in the shown embodiment is such that the because of the cantilever design and the fact that the traction wheels 2 are offset vertically and horizontally from road wheels 3, the device may maintain a load platform 6 at level both on those sections of track 4 that are level and on elevator track 30, which is shown having a slope. (FIGS. 3 and 4 show only one side of the tracks, the other of which will be understood to be in identical configuration and on the nearer side of vehicle 10, as each vehicle 10 runs on a pair of rails which comprise track 4, the rails being separated as seen from the top-down view in FIG. 7 by an aisle distance 40). A visual comparison of the orientation of vehicle 10 at location B, where it is on the elevator track, and at location C, where it is on a level location of track 4, shows the platform 6 maintaining level in each location without need for mechanical or weighted leveling. As shown, this is effected without variation of the fixed distance between the traction wheels 2 and the road wheels 3 (or between the axle or pivot point for such multiples of wheels 2 and 3, where multiple wheels are used), but rather by increasing the gauge (being the measurement of the vertical width of the rail, not the distance between the rails of the track) of the track as the slope increases.

It should be noted that the elevator track 30 may have a different slope than that shown. In fact, it is possible with appropriate configurations of vehicle 10 to have the track vertical or nearly vertical, though this is not particularly preferred. Another variation of the configuration shown would be to employ a vehicle 10 that more traditionally rides on a number of wheels that all rest atop the rails of the tracks (e.g., omitting road wheels 3 under the rail, and adding a fore or aft set of wheels 2 above the rail). Other modifications would have to be made to the configuration of the exchanges discussed below, but these are within the skill of those in the art, provided the concept of the invention in connection with the shown vehicle 10 and the exchanges as described below is considered as exemplary.

As shown at location A in FIG. 3, using a sloped elevator track 30 the transition between the elevator track 30 and the more level areas of the track(s) 4 can be made a smooth curve, thus allowing for a ready transition between the surfaces for the vehicle 10. To move between each level within an aisle of vertically separated tracks 4, the vehicle 10 travels to the elevator track 30 and then up or down to the desired track 4. To effect a vertical change in location, the vehicle 10 travels upward and downward along one or more inclined elevator tracks 30, each having a gauge greater than the level tracks if the configuration of vehicle 10 is used in which wheels 2 and 3 are on opposite (top and bottom) of the rails of the track. Obviously, to do so the vehicle 10 must be able to move from the track 4 to the elevator track 30 or vice versa at the points of intersection between the two. For this purpose, a switching system is used that is referred to by the inventor as an "Incline to Level Exchange System." At the level areas of track 4, the track has a relatively narrow vertical gauge, configured with reference to the expected configuration of vehicle 10 such that platform 6 is level. As the storage area has multiple levels, embodiments of the inventive system allow for a single elevator track 30, connectable to multiple levels of an aisle of shelving (e.g., shelves or floors). It is within the inventive scope that more than one incline could be used. It will be seen by looking at the transition from the elevator track 30 to the lowest level of storage in FIG. 3, that if the track always maintains a transition area (as shown at location A), the vehicle 10 could never pass down the sloped portion of track 4 lower than the permanent transition. To deal with this situation, the inventor has developed a variable switching system for use at the intersection of the elevator track 30 with each of the level portions of track 4 (above the lowest). This allows the vehicle 10 to vertically pass any number of tracks 4, which same tracks 4 can become later accessible to the vehicle 10 by changing the configuration of the switches.

With further reference to FIG. 3, the transition between level track 4 and inclined elevator track 30 is achieved by a system of switching gates near the point of convergence, which are now described in greater detail. The shown embodiment includes two main components in the construction of each switching gate: a ramp and a pathway (for each side of track 4). Ramps, like the tracks 4 and the inclined elevator track 30, provide a support surface upon which the wheels of the, vehicle 10 travel. As shown in the FIG. 3, ramps are labeled 21 for a location at which the vehicle will transition between horizontal and vertical, and are labeled 23 where the vehicle 10 will continue along the slope. Stated differently, ramps that form a part of the elevator track 30 are labeled 23 and may be referred to as "elevator ramps," and ramps that form a connection between a track 4 and elevator track 30 are labeled 21 and may be referred to as "track ramps."

A pathway, by contrast, is the gap left when a ramp is moved to an "open" position in which is it out of location for supporting passage of the wheel between elevator track 30 and track 4, such as by retracting away from the line of travel for vehicle 10. The pathway is or provides a corridor through which the wheels of vehicle 10 can pass. Pathways are shown, for simplicity's sake in FIGS. 3 and 4, as complete breaks between the elevator track 30 and the level portions of track 4 (except that between locations A and B there are dotted lines running through a pathway 20 to depict where an elevator ramp 23 would be if this were configured for travel along elevator track 30). It is of course possible that the rails are wider than necessary to support the travel of the wheels at such locations, in which case the pathway may be only a cut-away portion of the rail through which the wheel needs to pass, leaving the area outside of the wheelbase continuous. As shown in the figure, a pathway for a level-to-incline transition area is depicted by reference number 20, and a pathway for a location at which the vehicle 10 will continue travel on the sloped track 4 is referenced as number 22. Stated differently, this means that a pathway between the elevator track 30 and a track 4 is labeled 22, and a pathway that cuts into the elevator track 30 is labeled 20.

It should be understood that while the shown embodiment depicts the ramps 21 and 23 moving laterally of the track 4 or elevator track 30 to create the pathways 20 and 22 (see FIGS. 5, 6, and 8 through 11), so that the ramps end up parallel to these tracks, though out-of-line with them, other movement patterns could be used. For example, the ramps 21 or 23 could be hinged, such that they "swing" out of the way (upward or downward, or sideways). Likewise, they could slide into or onto another portion of track. In some configurations, the ramp may actually overlay the track in a different area (e.g., such as a section that folds back onto the rail over which the vehicle 10 will travel, if the ramp is thin enough).

Thus, for locations in which the vehicle 10 will travel along the slope of elevator track 30 to pass a track 4, ramps 23 are put into their closed position by moving them into place in the elevator track 30 (rendering the elevator track continuous or un-gapped in that area), and the pathways 22 are caused to be present between the elevator track 30 and the horizontal level of track 4 (rendering a passageway for the traction wheel 2 to travel along the elevator track 30 without hitting track 4). This configuration is shown by all portions of the track above location B in FIG. 3. In these closed positions, ramps 23 provide support for a desired path of a wheel along the length of the elevator track 30.

Conversely, the area between location B and location A in FIG. 3 shows a track configured to allow transition between elevator track 30 and horizontal track 4. Shown there, ramp 21 is in place in a closed position (rendering that specific level of track 4 and the elevator track 30 connected in a substantially continuous fashion, such that the ramp 21 provides support for a desired path of a wheel traveling between a track 4 and the elevator track 30), and pathway 20 is open (rendering elevator track 30 broken, gapped, or substantially discontinuous below the level of the ramp 21), meaning that as vehicle 10 passes over this area from above or from the right (with reference to the drawing), it will negotiate the transition. The rear, road wheel 3 (being disposed to ride below and against the under surface of the rail) will pass through the pathway 20 in the elevator track 30, and the front traction wheel 2 (being disposed to ride atop the surface of the rail) will ride along and atop the ramp 21 connecting track 4 to elevator track 30.

Figure 8:
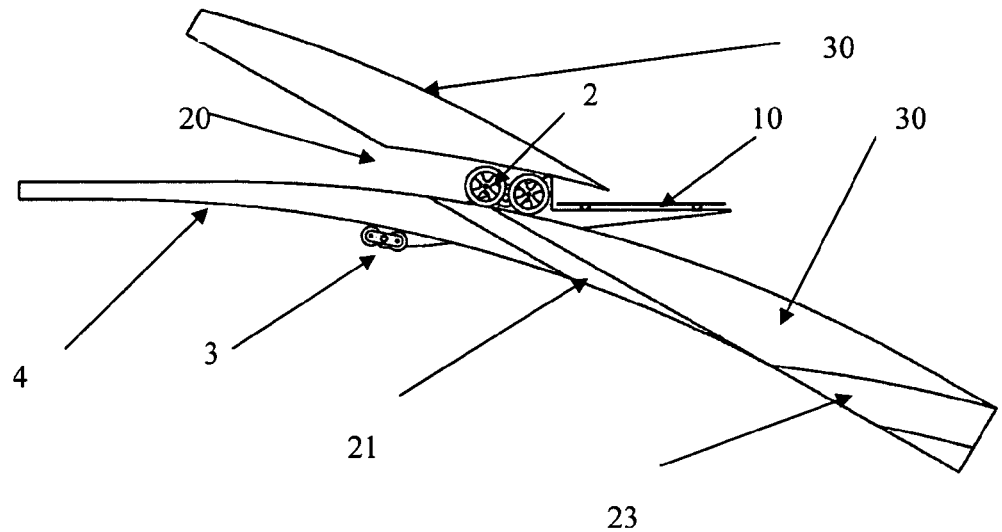
FIG. 8 shows a vehicle passing through an exchange, with the upper, traction wheels in a pathway.
Figure 9:
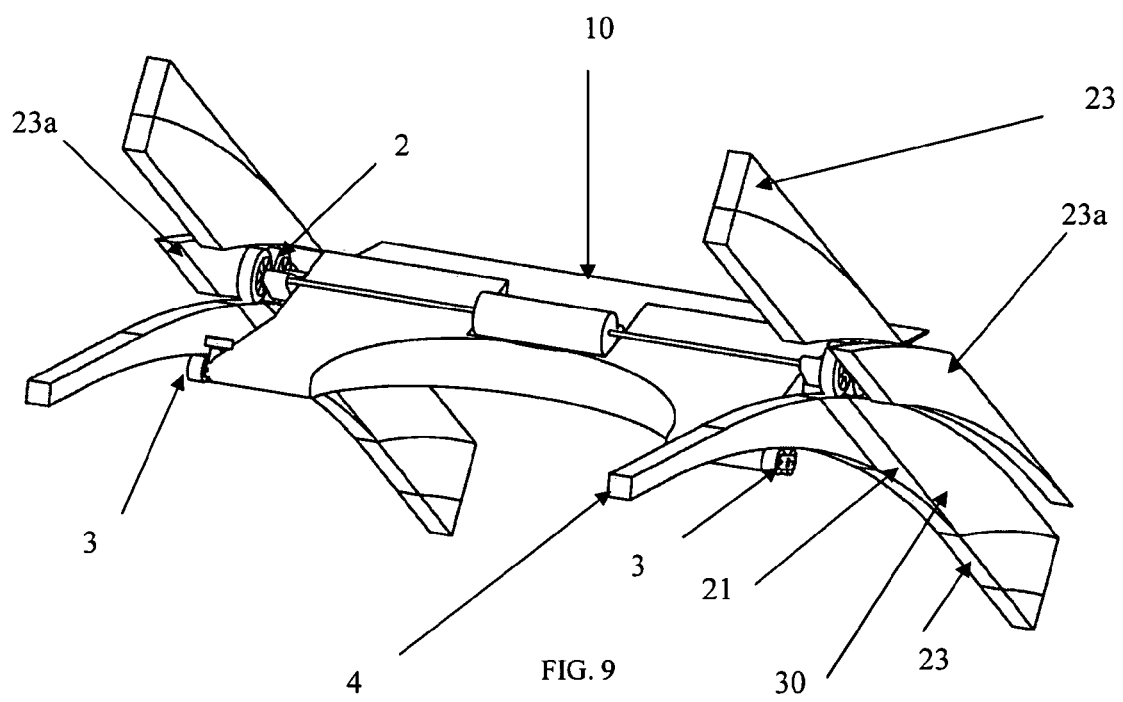
FIG. 9 shows the same position and vehicle as FIG. 8, but from a rear perspective angle
Figure 10:
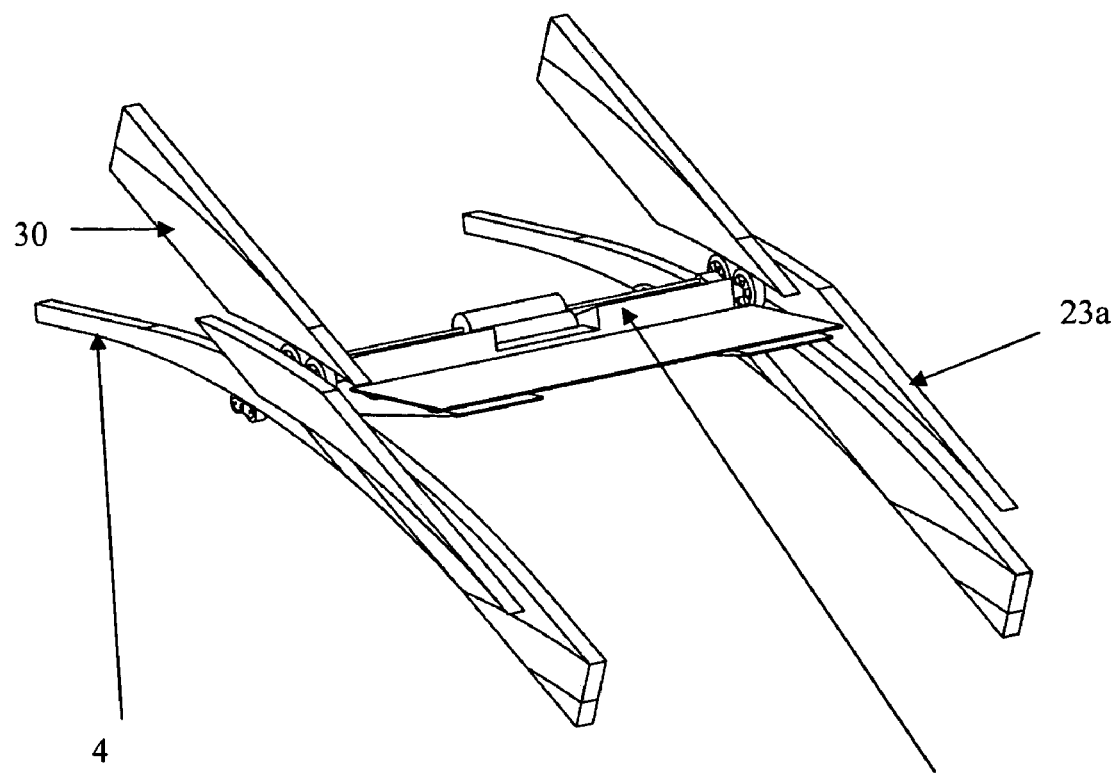
FIG. 10 shows the same position and vehicle as in FIGS. 8 and 9, but from a front perspective angle.
Figure 11:
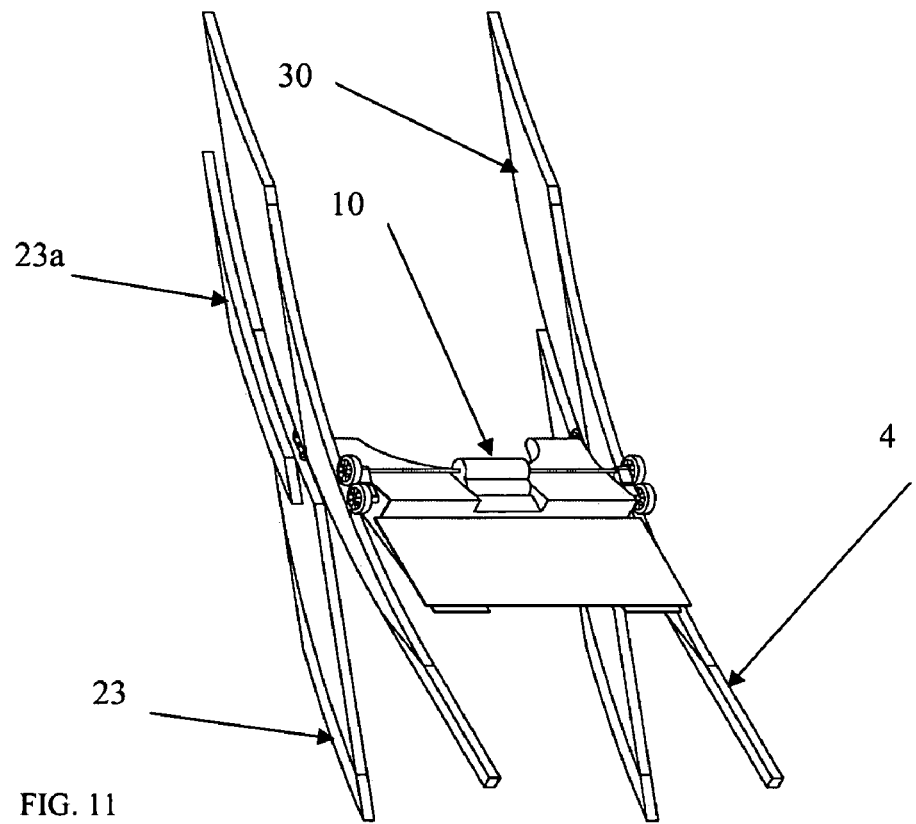
FIG. 11 shows a view similar to that in FIG. 9, but for use with a storage racking system in which the storage is above the elevator track.

It will be noted that the platform 6, being narrower than the aisle distance 30 between the rails of tracks 4, is allowed to pass up and down the elevator track 30 without interference even when the vehicle 10 is traveling along elevator track 30 and passing a number of tracks 4. If the platform 6 is to be of a greater width than aisle distance 40, the vehicle 10 could be configured such that platform 6 is positioned above or below tracks 4 when vehicle 10 is on a level track 4, and the pathways 22 could be made long enough to allow for passage of the platform 6 as well as the traction wheels 2. FIGS. 8 to 11 show the vehicle 10 near a system of the ramps and pathways from various angles. FIGS. 8 to 10 show a vehicle 10 positioned on the track system shown in FIG. 4, while FIG. 11 shows a vehicle 10 as positioned on a track system shown in FIG. 3.

It will be seen from the foregoing discussion that the elevator track 30 and the tracks 4 have upper and lower surfaces for supporting the wheels of the vehicle 10 (or, in a different configuration of the vehicle 10 that omits a lower wheel, they may have only an upper surface for supporting wheels). The discussion above demonstrates that the ramps operate to continue the supporting surface when the ramps are in their "closed" position. That closed position for a ramp 23 that forms a part of the elevator track 30 is the position in which the ramp is in place rendering the elevator track 30 continuous along its slope for purposes of a wheel passing over it (or, under it, as the case may be). The open position of that ramp 23 results in a pathway 20. Likewise, the closed position for a ramp 21, being between the elevator track 30 and the track 4, is when the ramp forms a support between the two allowing a wheel to roll against it in substantially continuous fashion from track-to-elevator track and/or vice versa. The open position for a ramp 21 results in a pathway 22. The open positions, then, are where the surface for supporting the wheels is broken, gapped, or otherwise reduced, such that a wheel can pass through at least a portion of that area where the supporting surface of the ramp otherwise would be.

Multiple configurations can be based on this concept taught in the embodiment shown in FIG. 3. The inventor discloses at least two general configurations of ramps and pathways, depending upon the configuration of the system. In the first configuration, meant for high storage (storage above the slope of the elevator track 30), wheel ramps and pathways work as discussed above. In an alternate embodiment, storage can occur below the slope of elevator track 30. This "low storage" configuration is shown in FIG. 4. It will be seen by comparison of FIG. 3 and FIG. 4 that the same principles apply, with certain variation. For example, in the "high storage" configuration shown in FIG. 3, the pathways 23 (pathways that represent corridors for passage of wheels through the elevator track 30) serve to allow passage of the lower wheels 3 through the area of the elevator track 30's path. Of course, this means that pathways 22 (those between the elevator track 30 and the tracks 4) serve to allow passage of the traction wheels 2. In contrast, in "low storage" conditions, the pathways 23 in the elevator track 30 allow passage of the traction wheels 2, and the pathways 22 between the elevator track 30 and the tracks 4 allow passage of the lower wheels 3.

It should be noted that with appropriate modifications, one may be able to combine high storage and low storage configurations. This may require use of multiple paths and ramps at each exchange in order to make the various transitions smooth. In such a case, it is possible to have a pathway through the elevator track 30, and ramps connecting the tracks 4 to the elevator track 30 on both sides of that pathway, so that the vehicle 10 could run past the elevator track 30 if desired, or, in connection with appropriate ramp and pathway configuration, could mount onto the elevator track 30 to descend (when coming from the side under the slope) or to ascend (when coming from the side above the slope).

Some or all parts within the system may be shared from wheel ramps to pathways and visa versa. For example, in situations in which space and weight savings are important, the material removed to form a pathway may actually be repositioned to create the ramp. Stated differently, a ramp 23 and ramp 21 could be the same structure, if made hinged or otherwise movable between the positions of those ramps in a way that would leave the necessary pathways clear at the appropriate configurations.

It should be noted that if an embodiment is used in which the vehicle 10 only has wheels that ride atop the tracks 4 and elevator track 30 (i.e., when the vehicle does not have lower wheels 3), the configuration of the track may omit the use of pathways 20 in the elevator track 30 for high storage situations. This is because there are no lower wheels 3 that need to pass through the elevator track. Likewise, in a low storage embodiment using such a vehicle without lower wheels 3, the pathways 22 between the tracks 4 and the elevator track 30 can be omitted, because there is no need to have a lower wheel 3 pass through those areas.

A possible advantage of this system in some configurations is an ability to utilize a multitude of storage systems. When storage is accessed by side loading, the vehicle 10 may use selective load handling as well as both pass-through and push-through equipment, such as actuators for toggling switches, turning screws, or other load delivery-triggering tasks. Loads may also be stored directly onto and then retrieved from directly the track in the path of the vehicle 10 creating a drive-through load handling system. This may occur where the load, such as a pallet, is wider than the aisle distance and rides above the track 4 on level track runs, and where the pathways 22 are sufficiently long to allow passage of the pallet. Mechanical devices could be used to raise and lower the pallet from contact with the track 4 (such as with a fork lift mechanism). This would allow for a warehouse to be created without any physical difference between aisles and intended storage locations, such that an area of tracks that is eleven rails wide (being thereby ten tracks wide) could be loaded with fully ten rows of material. In operation, this loading scheme could be used, for example, in a transport ship, to allow storage in all free space in the cargo area. One loading scheme would pack items that are to be removed immediately upon docking into every other set of tracks (e.g., even-numbered or odd-numbered tracks), such that following removal of that cargo, the remaining cargo is left in a system of stacks and aisles, from which cargo can be selectively pulled. A combination of load handling systems also can be used within the same aisle and/or facility. Multiple vehicles 10 can operate concurrently within the same aisle and/or facility with greater ease than in conventional systems.

Products handled by the vehicle 10 may need load handling or stowage devices, such as pallets, drum pinchers, buckets, or pill carousels. Such devices may be stored with the product (as in a pallet being loaded into the storage area with the product) or may travel primarily with the vehicle 10 (as one may expect of a pill carousel or drum pinchers).

The described vehicle 10 is not limited to service within the confines of a single aisle or within a single storage system. The vehicle 10 is capable of traversing and negotiating relatively long distances via Remote Access Tracks. These tracks, referred to now by inventor as RATs, allow the vehicle 10 access to multiple aisles, storage systems and locations for the purpose of product storage, loading, unloading or utilization. The teaching from the incline to level exchanges (such as the transitions between elevator track 30 and track 4, using paths and ramps) discussed above (the "exchanges") can be used in conjunction with techniques for dividing a railway into two horizontal paths, to provide the system with the ability not only to perform vertical location changes but horizontal as well. By way of example, the exchange could be used to split the track (vertically speaking, such as is described generally above for the system to change levels in an aisle), then each separate level of track could turn in different directions, horizontally speaking (e.g., left or right, as with railroad track changers). Horizontal (e.g., left and right) splitting of the track likewise could occur before an exchange or exchanges. Once a vehicle 10 passes through an exchange, the track 4 and subsequently the vehicle 10, is not required to travel in a straight line but may traverse along any number of RATs. RATs may be of simple track construction and can be mounted or suspended from above, supported from below, held from the sides, pass over ground, under ground, under water, in corridors placed in walls, floors and ceilings. RATs, and even aisles, can twist, turn, and make other variations from straight line travel. RATs, in particular but without limitation, may benefit from this ability, where a connecting track 4 between two parts of a warehouse allows for high speeds, in which banking and other "roadway" profiling may be valuable.

It will be understood that the traction wheels 2 and the road wheels 3 could be replaced with sets of wheels, respectively, as shown in the drawings. In such configurations, it would be useful for the sets of wheels to have a fixed axle or pivot point for each set, to allow them all come into contact with the track 4. Exemplary configurations are shown in the figures, though other configurations may be used. The drawings are considered a part of this disclosure and are hereby incorporated by reference.

Figure 5:
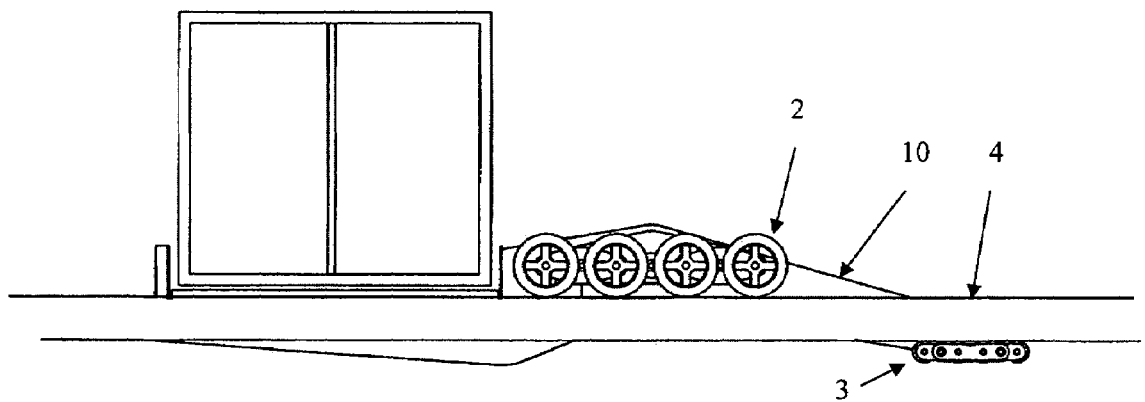
FIG. 5 shows a view of an alternative embodiment, located on a level run of track
Figure 6:
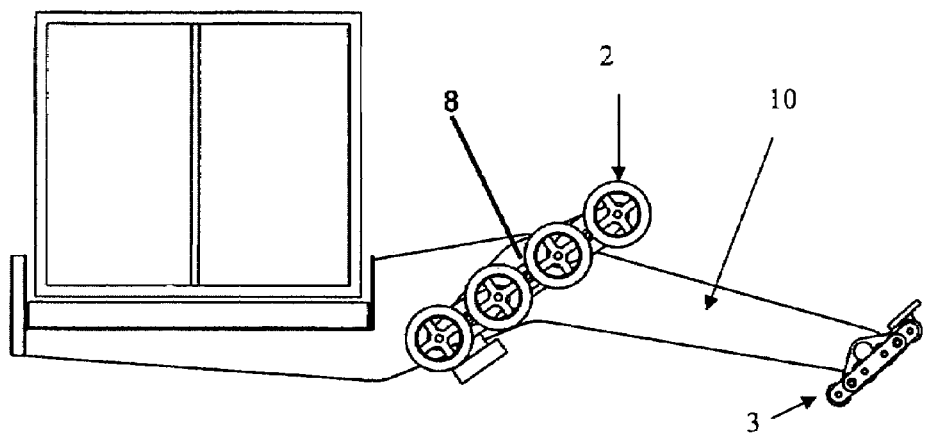
FIG. 6 shows the same vehicle as in FIG. 5, configured with wheels positioned for a slope of an elevator track

Turning to the other drawings, these are shown to assist in disclosure of potential embodiments and operation. FIGS. 5 and 6 show an embodiment with sets of wheels 3 and sets of wheels 2. FIG. 5 shows the embodiment at a level location of track 4. FIG. 6 shows the same embodiment located with the wheel sets rotated into substantially the position they would be expected to adopt on an elevator track 30 of a particular slope. Shown in the area of reference numeral 8 is the pivot point for the set of traction wheels 2.

Figure 7:
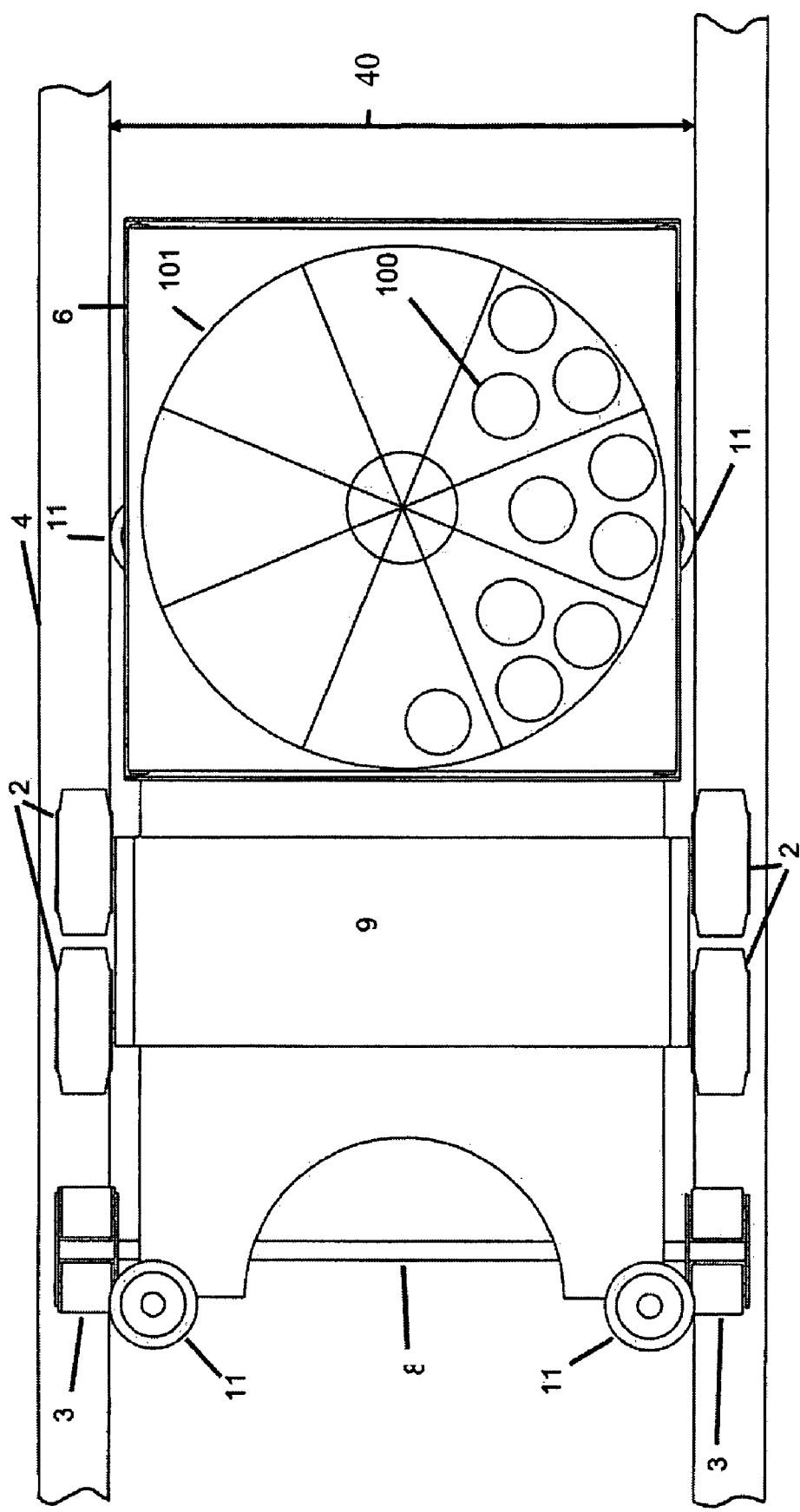
FIG. 7 shows a top down view of the vehicle on rails

FIG. 7 is provided to show a top-down view of the vehicle 10. In this shown embodiment, the aisle distance 40 is clearly shown. Road wheels 3 are visible as if seen through the tracks 4, though it will be understood that this is for sake of disclosure only, and that in an actual embodiment those wheels 3 may not be visible at this position, as they would be at least partially hidden by the track 4 under which they ride (assuming the rail is not transparent). Shown on the load area of vehicle 10 is a pill carousel, generally designated 101. Individual loads within the carousel may also be pill bottles or other sub-containers, as depicted by the presence of bottles 100. This view serves to show that the vehicle 10 may be fitted with interior bumper wheels 11, which have an axle disposed to cause the bumper wheels to run in contact with the inner side of track 4. These bumper wheels 11 serve to orient, possibly even "center," the vehicle 10 to increase the chance that the wheels 2 and 3 are optimally placed. The bumper wheels 11 also serve to keep the vehicle 10 from jamming against the rails of the tracks. The axles for bumper wheels 11 could be fitted to pivot within a plane that runs along the length of the track 4, such that they can change inclination when the vehicle 10 is on an elevator track 30, as opposed to a level track 4.

FIG. 8 is an exemplary depiction of a vehicle 10 passing through an exchange in a low storage configuration, where the traction wheels 2 are in a pathway 20, and the rear of a traction wheel 2 is actually touching one of the ramps 21 between the track 4 and the elevator track 30. In the shown position, the road wheels 3 are still on the track 4. This is shown in a low storage configuration (discussed above).

The same position is shown in perspective in FIG. 9. Here, ramp 23 is shown as open ramp 23a, being pulled out to the side to create the elevator path 20 and thus allow passage of traction wheels 2. Again the image in FIG. 10 shows essentially the same position, but from another angle.

FIG. 11 is another image of the vehicle (this time configured for high storage), located at a set of exchanges. Here, the traction wheels 2 can be seen on a ramp 21 between the track 4 and the elevator track 30. The lower wheels 3 are just passing through a pathway 20 opened in elevator track 30, which was left by a ramp 23 being in an open position (depicted as ramp 23a). Below the position of the vehicle 10 is shown the next ramp 23 in place in the elevator track 30.

Figure 12:
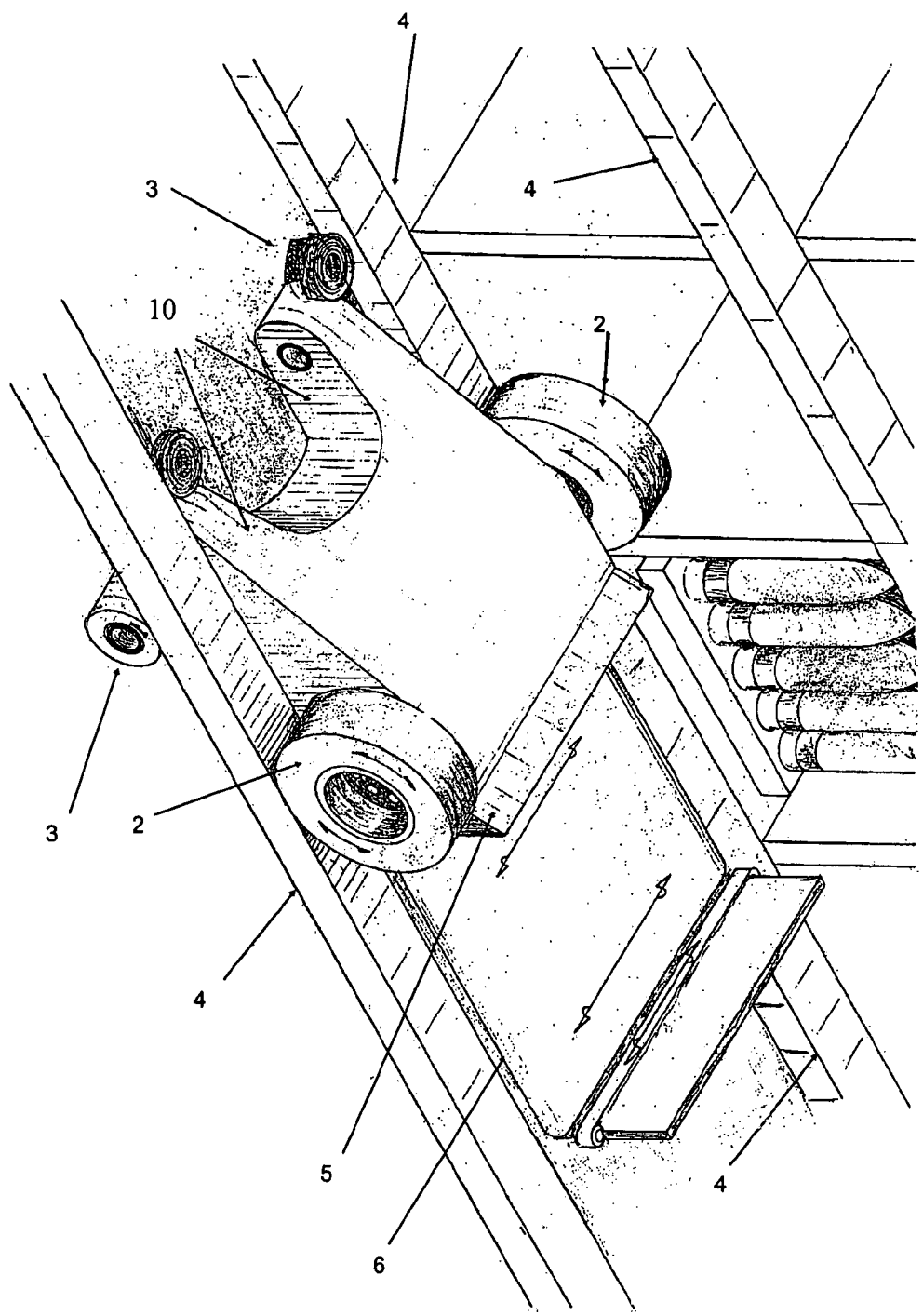
FIG. 12 is a rendition of the vehicle on a track near storage bins.

FIG. 12 shows a rendition of the vehicle at a storage location on track 4, where there are adjacent bins for storage.

Markets may include handling of secured and or hazardous products, storage, retrieval and delivery of supplies and equipment on board ships and in mobile equipment; under ground storage; order fulfillment; third party logistics centers; product distribution centers; pharmaceutical storage, retrieval and delivery; automated parking facilities for vehicles without passengers; clean room storage, retrieval and delivery; order picking, and other uses.

Other embodiments and advantages of the invention will be understood by those skilled in the art.

I claim:

1. A warehousing storage and retrieval system for warehousable objects comprising:
   a. A plurality of main tracks, said main tracks being vertically separated, each main track comprising at least two rails separated by a horizontal distance, and
   b. An elevator track comprising a surface for supporting a wheel of a vehicle, which vehicle is adapted to travel along the main tracks and the elevator track, which surface is set at an incline relative to at least a portion of the plurality of main tracks; wherein near an intersection of a main track and the elevator track, the system further comprises
      i. a track ramp movable between a closed position and an open position, in which closed position said main track is connected to the elevator track in a manner such that the wheel of the vehicle can travel from the main track onto the elevator track, and in which open position an opening exists between said main track and the elevator track through which opening the wheel of the vehicle may pass when traveling along the elevator track; and
      ii. a pathway in the elevator track, said pathway being closable by an elevator ramp, wherein when the pathway is closed the elevator track is capable of supporting the wheel as it travels along the elevator track past the pathway, and wherein when the pathway is open the wheel may pass through the pathway.

2. A warehousing storage and retrieval system for warehousable objects as in claim 1, wherein the pathway when in the open position forms a path below the point of connection between said main track and the elevator track.

3. A warehousing storage and retrieval system for warehousable objects as in claim 1, wherein the gauge of said main track is less than the gauge of the elevator track.

4. A warehousing storage and retrieval system for warehousable objects as in claim 1, wherein a top surface of the track ramp increases smoothly from the slope of said main track to the slope of the elevator track.

5. A warehousing storage and retrieval system for warehousable objects as in claim 1, wherein when the track ramp is not in its closed position, it can be positioned to act as the elevator ramp in the elevator ramp's closed position.

6. A warehousing storage and retrieval system for warehousable objects as in claim 1, wherein the vehicle contacts a top of the main track with a first set of wheels, and contacts a bottom of the main track with a second set of wheels that is horizontally and vertically offset from the first set of wheels.

* * * * *